INVENTOR.
Ward F. O'Connor

BY Marn & Jangarathis
ATTORNEYS

Oct. 22, 1968     W. F. O'CONNOR     3,406,846
POSITION CONTROL SYSTEM FOR AN ARTICLE HANDLING APPARATUS
Filed July 7, 1967     7 Sheets-Sheet 5

INVENTOR.
Ward F. O'Connor

BY

*Marn & Jangarathis*

ATTORNEYS

Oct. 22, 1968      W. F. O'CONNOR      3,406,846
POSITION CONTROL SYSTEM FOR AN ARTICLE HANDLING APPARATUS
Filed July 7, 1967      7 Sheets-Sheet 7

INVENTOR.
Ward F. O'Connor

BY *Marn & Jangarathis*

ATTORNEYS

United States Patent Office

3,406,846
Patented Oct. 22, 1968

3,406,846
POSITION CONTROL SYSTEM FOR AN ARTICLE HANDLING APPARATUS
Ward F. O'Connor, Denville, N.J., assignor to The Lummus Company, New York, N.Y., a corporation of Delaware
Filed July 7, 1967, Ser. No. 651,791
20 Claims. (Cl. 214—16.4)

ABSTRACT OF THE DISCLOSURE

Automated warehouse apparatus operating at a central point for continuously controlling a load transporting carriage located at a remote point to retrieve a load from a preselected storing space or to place a load therein, and comprising a plurality of groups of discrete electric buses, each group including continuous electric conductors and segmented conductors, for continuously transmitting instructional signals from the central point to the remote point and vice versa, and a plurality of electric motors located on the carriage and controlled by the instructional signals continuously transmitted on the electric buses for providing the necessary X, Y and Z movements of certain components of the carriage to achieve the load retrieval or placement actions. An amplifier derives low values of direct current from low voltages of direct current voltage to provide the instructional signals.

---

This invention relates to an apparatus including a controllable load-carrying carriage and operable at a central point to continuously address the carriage located at remote points for retrieving discrete loads from or placement thereof in a plurality of storing spaces located at different elevations, and more specifically to an improved arrangement comprising a plurality of groups of discrete electric buses for continuously transmitting instructional signals between the central and remote points. In one form the instructional signals comprise electric voltages of distinctive magnitudes and polarities with low magnitudes of current originating at the central point as instructional signals to activate the carriage to particular storing spaces for retrieving from or placing loads therein.

Automatic apparatus is well-known in the prior art for retrieving or placing loads in particular spaces disposed at different levels in a group of load storing spaces. The loads are usually retrieved from or placed in the respective storing spaces via floor or overhead cranes under control of automatic mechanisms activated by data equipment or the like. A problem attending the operation of such automatic apparatus is one involving the transmission reliability of the instructional signals thereto to perform the load retrieval or placement operations. A faulty transmission of such signals often results in errors in the instructions whereby the apparatus is activated to perform incorrect operations. As a consequence, damage may result to the apparatus as well as the loads in attempting to place loads in storing spaces occupied at the moment. In addition, faulty operation of the apparatus may result in the maintenance of incorrect records.

The present invention involves an improved arrangement for reliably transmitting operational instructions from centrally located control equipment to a remotely located carriage for retrieving from or placing discrete loads in a plurality of storing spaces located in different levels and areas at the remote points.

A principal object of the present invention is to provide improved transmission of operational instructions to an automatic load storing apparatus.

Another object is to transmit reliable instructing signals to an automatic load storing apparatus.

A further object is to transmit operational instructions in the form of discrete electric voltages of low magnitudes to an automatic load storing apparatus.

An additional object is to limit the magnitude of electric current of discrete electric voltage having differing magnitudes and utilized as operational instructions to an automatic load apparatus.

Still another object is to improve the reliability of operation of an automatic load storing apparatus.

A still further object is to improve the fidelity of instructional voltages in automatic load storing apparatus.

In association with an automatic apparatus including a load-carrying carriage and utilizing several motors for actuating crane equipment and the carriage in different directions to retrieve from or place discrete loads in a plurality of storing spaces located in different vertical rows at different levels therein on one side or both opposite sides of an aisle of load storing spaces, a specific embodiment of the present invention comprises a plurality of groups of discrete electric buses, each group including continuous electric conductors and several electric bus segments and a plurality of electric voltage pickup shoes engaging the several bus segments and continuous conductors, for continuously transmitting discrete electric voltages of varyingly low magnitudes and polarities as instructional signals to control the respective motors for actuating the crane equipment and carriage in appropriate directions to retrieve from or place the loads in the storing spaces, and electronic amplifiers to derive the instructional voltages at low magnitudes of electric current from the continuous electric conductors and segments in the respective groups of conductors and segments via the pick-up shoes engaged therewith for providing voltages of varying difference magnitudes to energize the respective motors and thereby to actuate the crane equipment and carriage in predetermined directions. This enables the application of highly accurate instructional signals derived by the amplifier from the conductors and segments of the several groups of conductors and segments to the respective motors in order to enable the latter to position the crane equipment and carriage at the correct preselected storing spaces for performing the correct load retrieving or placing action.

One feature of the invention utilizes a plurality of electric conductive segments for transmitting instructional signals to a crane and a carriage for retrieving from or placing loads in preselected elevated storing spaces of one group thereof.

Another feature involves the use of operational amplifiers for deriving instructional voltages of varying difference magnitudes from electric conductors and segments to locate the crane and carriage at correct load storing spaces for retrieving loads therefrom or depositing loads therein.

A further feature concerns the utilization of operational amplifiers for deriving instructional voltages from electric conductors and segments at low magnitudes of electric current.

Still another feature utilizes the use of operational amplifiers for deriving instructional signals from the electric conductors and segments with a high order of fidelity.

It is a still further feature to provide enclosures disposed partially in proximity of each group of electric conductive segments as protection against damage, environmental dirt and inadvertent short circuits.

An additional feature includes a plurality of groups of electric conductive segments for transmitting instructional signals to a crane and a carriage for retrieving from or placing loads in a preselected storing space in a group of load storing spaces out of a plurality of groups of storing spaces.

A still further feature employs ferromagnetic sensors for properly aligning the positions of the crane and carriage in front of a preselected storing space before the load retrieval or placement commences.

Another feature includes an automatic operation of the crane and load carriage in response to program logic.

Still another feature concerns a use of pushbuttons to provide a semiautomatic operation of the crane and carriage.

An additional feature involves acceleration and deceleration of the crane depending upon its location at a given time relative to a preselected load storing space.

A still further feature relates to a signal pick-up device which may be a contact or a proximity type.

Another feature concerns the signals which may comprise analog, digital, pulse or alternating current tone types.

The invention is readily understood from the following description taken together with the accompanying drawings, in which.

Figure 1:
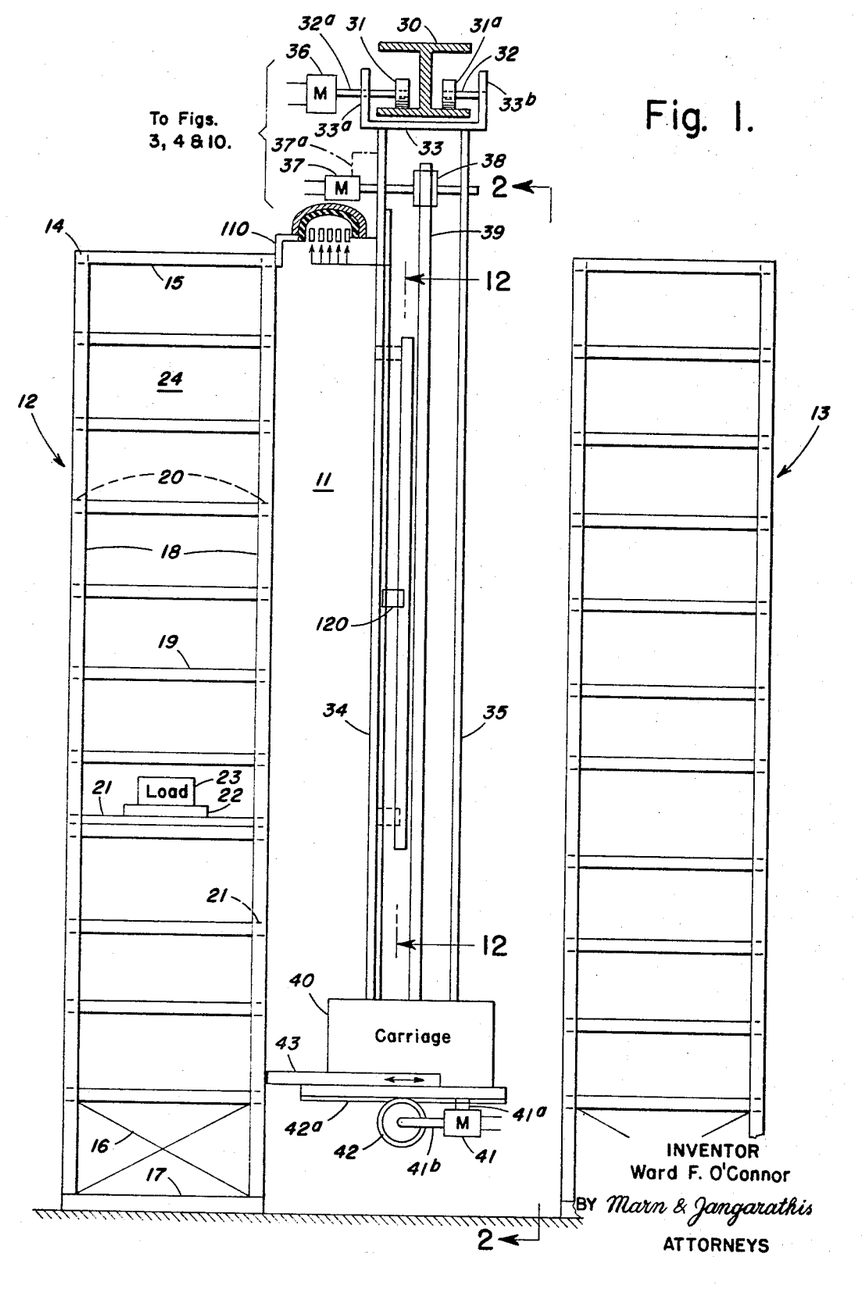
FIG. 1 is an end elevational view of two groups of load storing spaces located on opposite sides of an aisle and serviced by an automatic load retrieving and placing apparatus adapted with a specific embodiment of the present invention.
Figure 2:
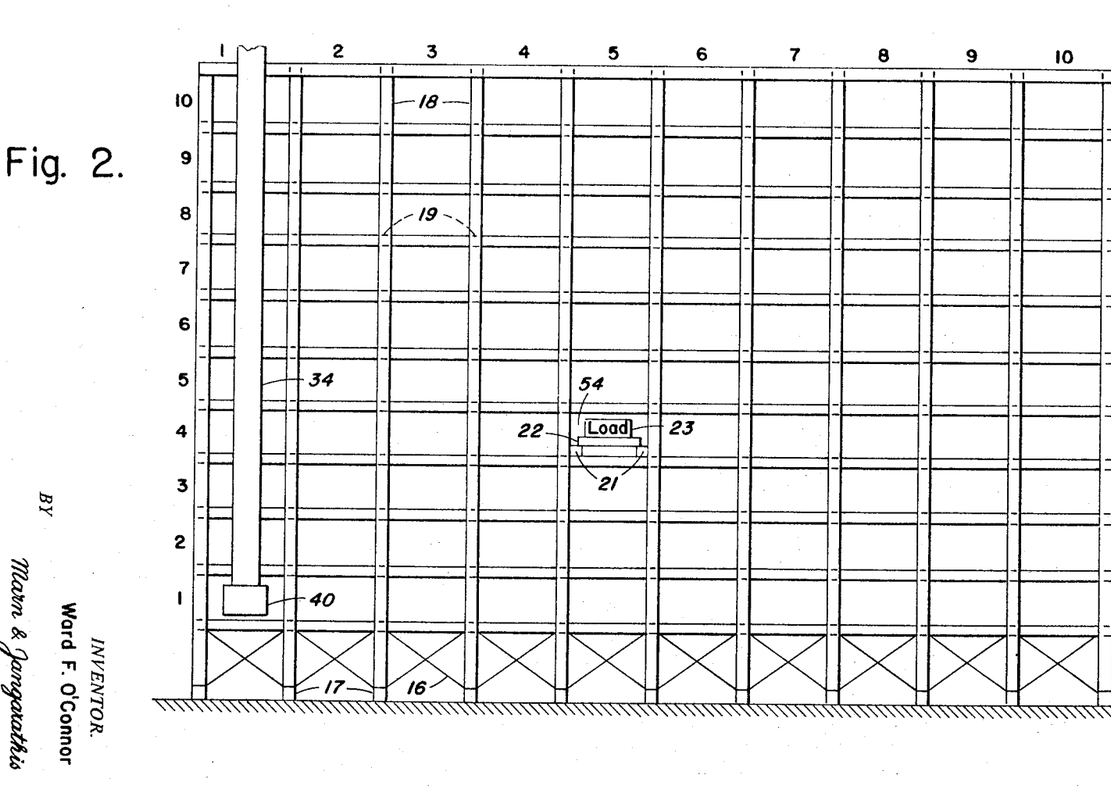
FIG. 2 is a partial elevational view taken along line 2—2 in FIG. 1.

FIGS. 1 and 2 show a load storing framework including a central aisle 11 flanked on opposite sides with load supports 12 and 13, each having structures 16, 16 of a suitable type familiar to the art and mounted on spaced floor members 17, 17, to elevate the respective load supports above the loading floor for a purpose that is presently mentioned. Each load support comprises a plurality of parallel rows of identical posts 18, 18, uniformly spaced on the front and rear sides of the aisle and vertically mounted on the floor members. At their uppermost ends, the aisle posts are interconnected by parallel longitudinal members 14, 14, and parallel transverse members 15, 15. The aisle posts and top longitudinal and transverse members are connected together by a plurality of transverse side members 19, 19, and front and rear members 20, to give sturdiness to the framework. This framework now embodies a plurality of vertically and horizontally aligned discrete load storing spaces 24, 24, of common dimensions. The framework may be further reinforced in any well-known manner, not shown, as desired. The front and rear members 20 mounted on the spaced front and rear members 18, 18, in each of the load storing support spaced members 21 on which a pallet 22 and a load 23 are positioned. The pallet and load thereon are shown in one load storing space for a purpose that is subsequently explained. It is understood that the storing spaces accommodate loads of predetermined weights and volumes.

FIG. 1 illustrates an overhead I-beam track 30 extending longitudinally along aisle 11 and positioned above load supports 12 and 13. This track is supported and spaced equidistantly from and in parallel relation with the opposing front faces of the load supports in a suitable manner, not shown. Spaced rollers 31, 31a are movably mounted on the spaced upper surfaces of the I-beam lower flange 32 and include roller 31 fixedly supported on a rotatable shaft 23a and roller 31a rotatably supported on a fixed shaft 32b. Shaft 32a is rotatably mounted in vertical leg 33a of U-shaped member 33 and shaft 32b is fixed in vertical leg 33b of the latter member. Two spaced elongated rectangular members 34 and 35 have corresponding ends suitably secured to the lowermost surface of the U-shape member to depend therefrom in parallel relation with each other and the opposing front faces of load storing spaces 24, 24, embodied in the respective load supports 12 and 13. It is thus apparent that depending member 34 has one surface of maximum dimension disposed in parallel relation with and spaced from the front faces of the storing spaces in load support 12 while depending member 35 has one surface of maximum dimension disposed in parallel relation with and spaced from the storing spaces in load support 13.

A motor 36 in FIG. 1 having a rotor fixedly geared to shaft 32a carrying roller 31 in a manner familiar to the art for driving purposes actuates the U-shape member and elongated rectangular members depending therefrom back and forth along the I-beam track and thereby back and forth past the front faces of the storing spaces in the load supports in accordance with the rotational direction of the motor shaft 32a at a given movement in a manner and for a purpose that will be presently described.

Figure 3:
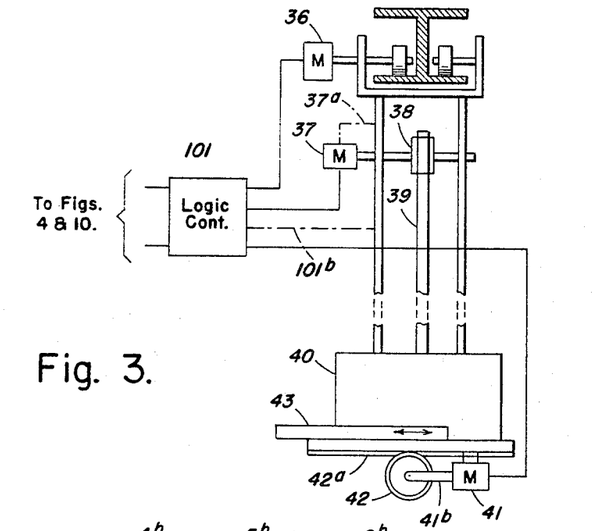
FIG. 3 is a partial elevational view looking into the front end of FIG. 1.
Figure 11:
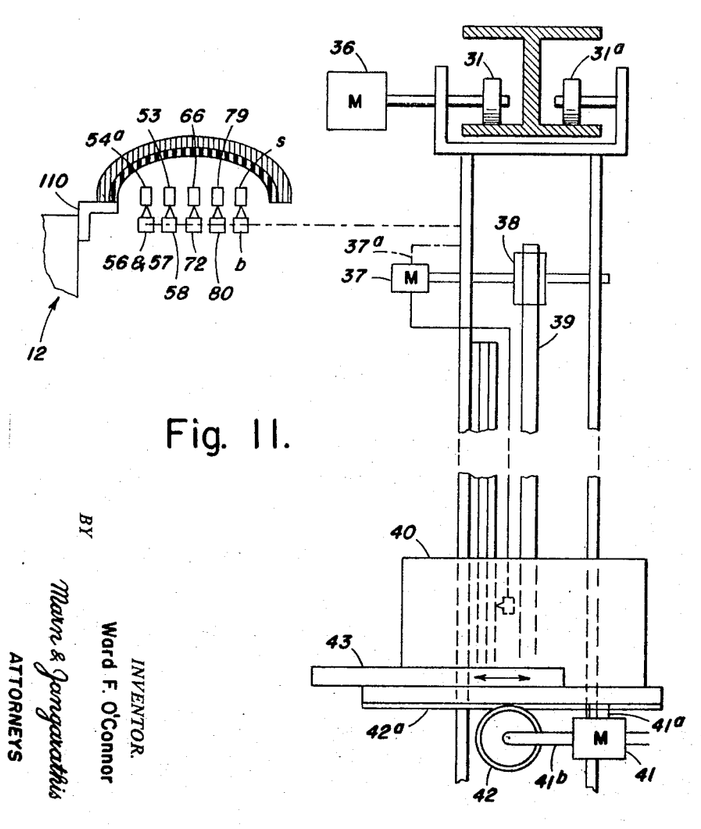
Figure 12:
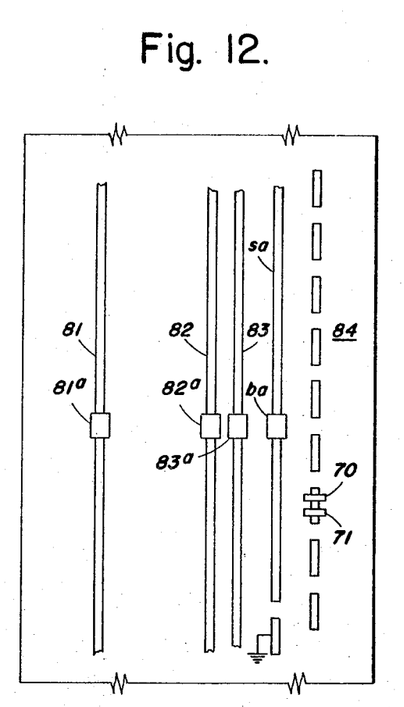
FIG. 12 is an enlarged partial elevational view taken along line 12—12 in FIG. 1.

A motor 37 in FIGS. 1, 3, and 11 mounted via support 37a on elongated member 34 drives a sprocket 38 and thereby a chain 39, or a drum and cable as desired, in a conventional manner to raise and lower a carriage 40 in front of the storing spaces of each vertical column thereof in load supports 12 and 13 in accordance with the directional rotation of the motor shaft at a given moment in a manner and for a purpose that are subsequently stated. Carriage 40 is guided in its rising and lowering movements by a suitable means, not shown, of which many are well-known in the the art. A motor 41 mounted suitably, via support 41a, on an undersurface of the carriage has its rotor connected via a suitable shaft 41b to a pinion gear 42 engaging the teeth of a rack 42a of a telescoping type. A fork 43 mounted on the rack is extensible into individual load storing spaces of load support 12 or 13 or retractable therefrom in accordance with the directional rotation of the motor shaft at a given movement in a manner and for a purpose that are hereinafter explained. Motors 36, 37 and 41 may be programmed for the retrieval from or placement of pallets and loads in preselected load storing spaces in FIGS. 1 and 2.

In the operation of the afore-described equipment, it is well-known in the art that when motors 36, 37 and 41, for example, are properly energized and deenergized in a programmed timing sequence, fork 43 can be extended into or retracted from a particular storing space, which was preselected in certain vertical and horizontal rows in load support 12 or 13, to retrieve a pallet and load therefrom or to place a pallet and load therein. Inasmuch as U-shaped member 33, depending members 34 and 35, and carriage 40 are thus arranged to service load storing spaces in either load support 12 or 13, it is understood that motors 36, 37 and 41 may be programmed to service load storing spaces in either load support 12 or load support 13 at a given time. Control circuits, not shown, for achieving such motor operation are well-known in the art as hereinafter mentioned.

In accordance with a specific embodiment of the present invention, a plurality of groups of electric buses are provided to supply instructional signals to motors 36, 37 and 41 in FIGS. 1, 3, 4, 10 and 11 for energizing and deenergizing the respective motors in a logical sequence in a manner which is now explained. For the purpose of the instant description, it is illustrated in FIGS. 1 and 2 that each of load supports 12 and 13 comprises ten columns of load storing spaces, each column containing 10 discrete load storing spaces and numbered from 1 through 10 commencing at the left as shown in FIG. 2, and ten horizontal rows of load storing spaces, each row containing 10 discrete spaces and numbered from 1 through 10 commencing with the storing space located nearest to the floor in FIG. 2. Thus, it is apparent in FIG. 2 that each load storing space in common to one column and one horizontal row of load storing spaces in each of load supports 12 and 13, and that one hundred load storing spaces are contained in each of the latter supports. It is obvious that the respective load supports may embody more or less than one hundred load storing spaces as well as two or more load supports similar to load supports 12 and 13 on each side of the aisle in FIG. 1, if desired.

Figure 4:
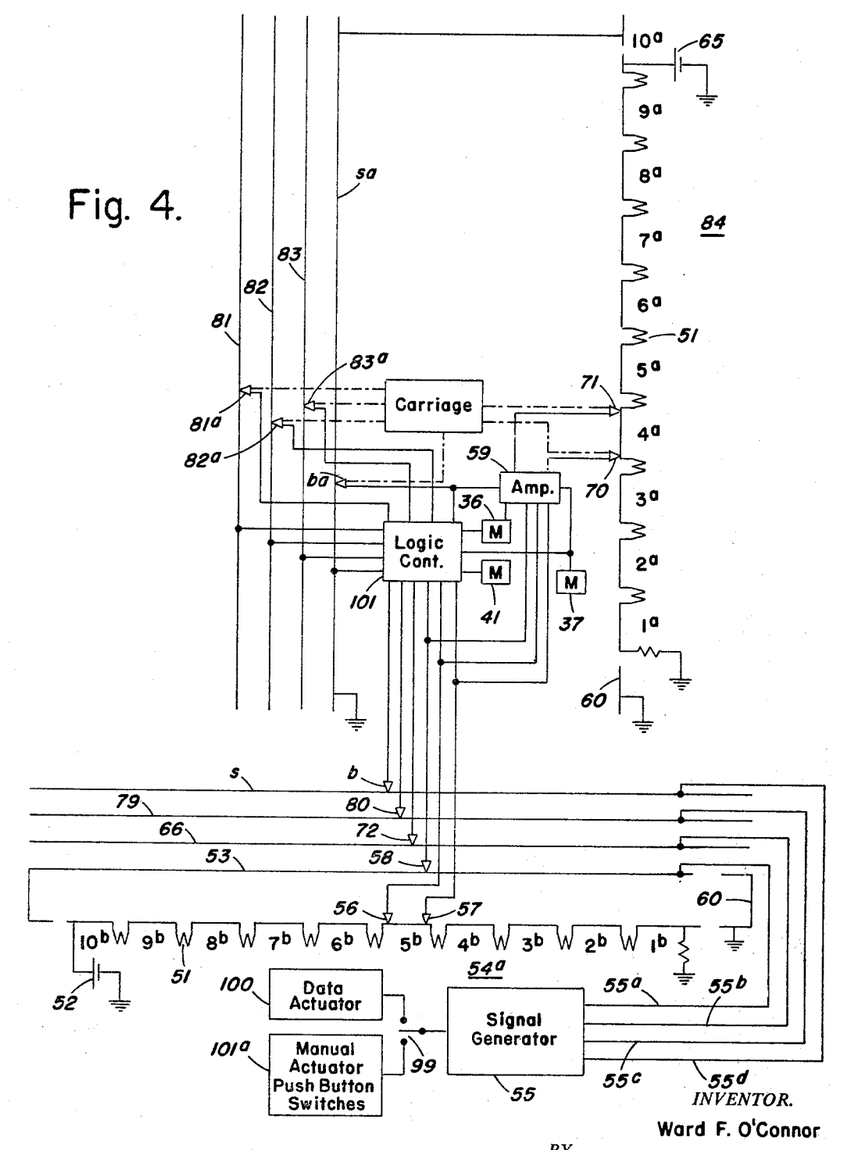
FIGS. 4 through 7, 8A, 8B, 9 and 11 are essentially circuit diagrams showing the derivation of instructional signals usable in FIG. 1.

It is now assumed for the purpose of this description that a pallet and load are positioned in a preselected storing space located in vertical column 5 and horizontal row 4 and identified hereinafter as load storing space 54 in load support 12 in FIG. 2, and that this pallet and load are to be retrieved therefrom and transferred to a loading and unloading station, not shown, in a manner which is presently explained. It is understood that the loading and unloading station may comprise a preselected load storing space connected via an endless belt to a trucking platform, not shown. It is seen in FIG. 4 that ten electric conductive elements having predetermined lengths and arranged in single file in a horizontal straight line with equal amounts of spacing between the ends of adjacent segments are consecutively numbered from $1b$ through $10b$. For the purpose of this description, each pair of adjacent segments is connected by a resistor 51, and all segments and resistors are serially connected across the positive and negative terminals of a source 52 of direct voltage. The lengths of the respective segments and spacings therebetween are determined in relation to the horizontal dimensions of the respective storing spaces. This combination of segments is identified hereinafter as conductor $54a$ in FIGS. 4, 10, 11 and 13 to simplify the description as it is later seen. The respective resistors embody equal magnitudes of fixed effective resistance to ensure a drop of one volt thereacross.

As a consequence, segment $10b$ is provided with an effective voltage of ten volts, segment $9b$ with nine volts, and so on in a progressively decreasing numerical order of 1-volt steps until segment $1b$ is provided with an effective voltage of one volt. Segment $1b$ through $10b$ are thus provided with progressively increasing amounts of discrete voltages in 1-volt steps from one through ten volts, respectively. This permits preselection of segments $1b$ through $10b$ or the voltages provided thereon to represent the storing spaces in the columns 1 through 10, respectively, in load support 12, commencing at the left and looking into the front faces of the discrete storing spaces as illustrated in FIG. 2. Thus, each horizontal conductive segment is positioned in front of one column of storing spaces, commencing at the lefthand column of storing spaces in load support 12 as illustrated in FIG. 2, in a manner that is subsequently mentioned. The segments may be so arranged as to provide either increasing voltage magnitudes from one through ten volts or decreasing voltage magnitudes from ten volts through one volt, as preferred. For the purpose of this description, segment $1b$ is positioned in front of storing space column 1, segment $2b$ in front of storing space column 2, and so on until segment $10b$ is positioned in front of storing space column 10. Segment $1b$ is provided with one volt, segment $2b$ with two volts, and so on until segment $10b$ is provided with ten volts.

Referring again to FIG. 4, it is seen therein that an elongated continuous electric conductor 53 located adjacent to associated segments $1b$ through $10b$ in front of the vertical columns 1 through 10 in FIG. 2 and coextensive with the latter segments has its end connected via lead $55a$ to a generator 55 of signaling direct voltage. This generator is operable to vary its output signal voltage in discrete steps of one volt for the purpose of this description, in a range from one through ten volts, for a signaling purpose that is hereinafter explained. The segments and associated conductor are suitably mounted in relation to load support 12 in a manner and for a purpose that are now explained.

It is seen in FIGS. 1, 4, 10, 11 and 13 that a plurality of angle brackets 110 suitably secured in spaced relation to the top of load support 12 on the side adjacent to and parallel with central aisle 11 mounts in an appropriate fashion a housing 111 formed of a rigid material substantially in a semicircle and lined on its interior surface with a suitable electric insulating substance 112. Positioned interiorly of the housing and mounted on support $113a$ in spaced parallel relation in a transverse direction as shown in FIG. 4 are electric conductor $54a$ representing the respective conductive segments $1b$ through $10b$ and electric pick-up shoes 56 and 57 (FIG. 4), electric conductor 53 and engaging pick-up shoe 58, electric conductor 66 and engaging electric shoe 72, electric conductor 79 and pick-up shoe 80, and spare continuous conductor $s$ and engaging pick-up shoe $b$. Support 113 has one end adapted to carry shoes 56 and 57, 58, 72, 80, and $b$ in fixed spaced transverse relation and an opposite end fixedly secured to depending elongated member 34 in a suitable fashion. The several conductors and pick-up shoes engaged therewith are hereinafter discussed with reference to their respective functions. It is understood that the number and spacing of angle bracket 110 is determined by the length of load support 12 and weight of the housing and electric conductors, and that supports 113 and $113a$ are electrically insulated from the electric conductors and pick-up shoes.

Figure 6:
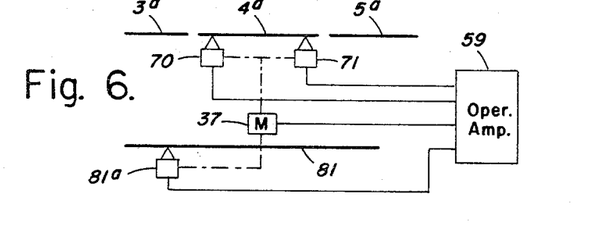
Figure 7:
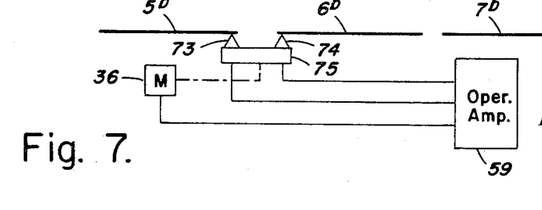
Figures 10, 13:
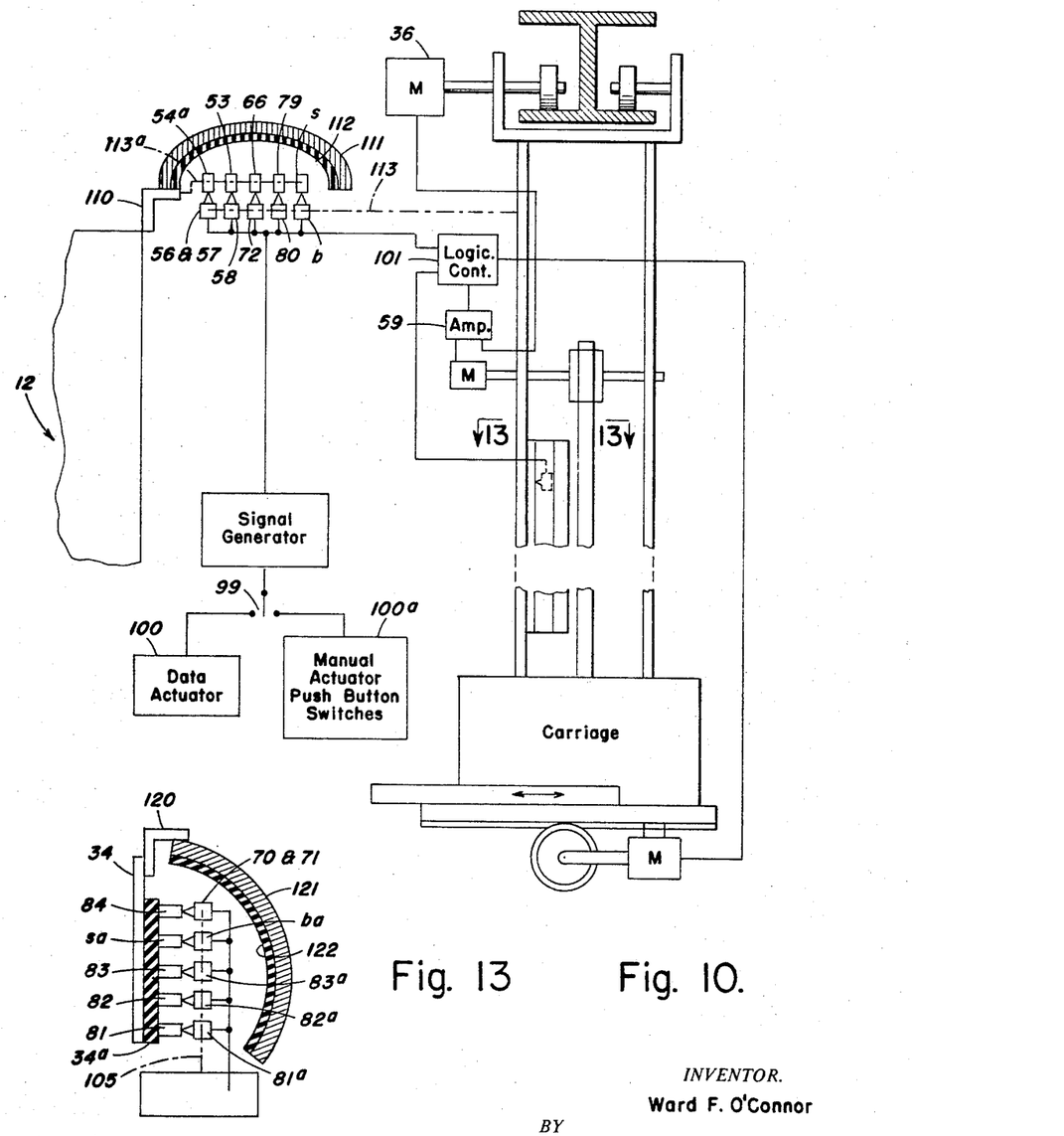
FIG. 10 is a schematic arrangement showing an automatic or a semiautomatic operation of the specific embodiment of the invention.
FIG. 13 is an enlarged plan view taken along line 13—13 in FIG. 10.

As the pallet and load disposed in preselected loading space 54 in load support 12 in FIGS. 1 and 2 are to be retrieved therefrom and transferred to the loading and unloading station as hereinbefore mentioned, it is now recalled from the previous description of FIG. 4 that voltage source 52 applying a direct voltage across the serially connected segments and resistors consitituting conductor $54a$ provides an effective voltage of five volts to segment $5b$. This segment represents vertical column 5 of the load storing spaces in load support 12 in FIG. 2. As an initial step in FIGS. 1, 2, 4, 10, 11 and 13, switch 99 is actuated to connect data actuator 100 in circuit with voltage signaling generator 55. For semiautomatic operation switch 99 is actuated to connect manual actuator $100a$ comprising a plurality of push-buttons functioning in the well-known manner for initiating instructional signals to the voltage signaling generator for a purpose and in a manner hereinafter stated. As a consequence, the actuator may be operated to send instructional signals to signal generator 55 to energize motors 36 and 37. In FIGS. 4 and 11, data actuator 100 stimulates generator 55 to apply a voltage of five volts via lead $55a$ to conductor 53 for also representing the vertical column 5 of load storing spaces and a voltage of 4 volts to conductor 66 via conductor $55b$ for also representing the horizontal row 4 of load storing spaces in FIG. 2. It is now assumed for the purpose of this description that actuator 100 containing the instructional signals in FIG. 10 is operated to initiate such further action in signal generator 55 as is necessary to retrieve the pallet and load from storing space 54 in load support 12 in FIGS. 1 and 2 and to transfer this pallet and load to the loading and unloading station in a manner that is hereinafter explained. The data actuator may comprise any one of several well-known types such as, for example, tapes, punched cards, computers, or the like. At this time, it is understood that motors 37 and 41 are deenergized. Energized motor 36 actuates roller 31 to move U-shape member 33 and depending members 34 and 35 on track 30 across the front faces of load supports 12 and 13 and at the same time actuates electric pick-up shoes 56, 57 and 58 shown schematically in FIGS. 4, 10 and 11. It is to be understood that the dot-dash lines in FIGS. 5, 6 and 7 are merely to indicate that the several shoes are actuated by the respective motors 36 and 37 at appropriate timing intervals.

Figure 5:
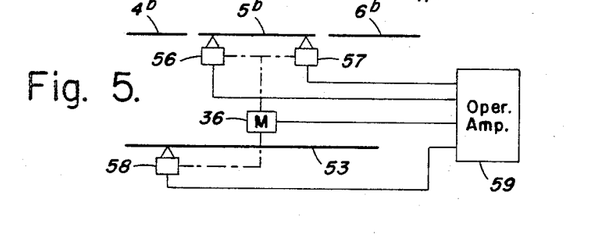

As contact shoes 56 and 57 in FIG. 4 are simultaneously actuated in slidable engagement with one or more segments 1b through 10b in sequence in a direction depending upon the initial relative positions of the shoes at the time of the starting of motor 36 and as contact shoe 58 is also actuated in slidable engagement with conductor 53, the voltages picked up by the respective shoes 56 and 57 are individually compared via logic control 101 with the voltage picked up by shoe 58 in operatinal amplifier 59 in FIGS. 5 and 10. It is understood that the necessary electrical connections from the motors to the pick-up shoes, amplifier and the like are schematically shown as full lines in FIGS. 5 and 10, as well as in other figures of the drawing, for the purpose of simplifying the description.

The operational amplifier is a negative feedback type having a high gain characteristic and a structure well-known in the art. It is described in detail in a publication entitled "Handbook of Operational Amplifier Applications," Copyright 1963, and made available to the public by Burr-Brown Research Corporation, P.O. Box 6444, Tucson, Ariz. 85716. Characteristics of the amplifier comprise: (1) high input impedance, (2) high open loop gain, and (3) low output impedance. These characteristics enable the amplifier to draw a low magnitude of input current in the range of one through ten volts of discrete 1-volt direct voltage steps employed herein as signaling instructions to stimulate the automatic apparatus into desired load retrieving or placement operations without affecting the accuracy of the signaling instruction while at the same time providing a high gain which may be precisely predetermined.

The amplifier translates the compared voltages into other voltages having difference magnitudes in such manner that the difference voltages between the voltages of shoes 56 and 58 and of shoes 57 and 58 serve respectively to energize motor 36. So long as the magnitude of one voltage difference or the magnitudes of both voltage differences is greater than zero, motor 36 is continuously energized to actuate roller 31 to actuate shoes 56 and 57 in sliding engagement with the respective segments 1b through 10b and shoe 58 in sliding engagement with conductor 53 in FIG. 5. While motor 36 is energized to actuate roller 31, the spaced elongated members 34 and 35 supporting carriage 40 thereon are moved to the right or left past the front faces of the vertical columns 1 through 10 of load storing spaces in FIG. 1 and 2 depending upon the location of the members and carriage at the initial energization of motor 36. When, however, shoes 56 and 57 are positioned adjacent to the opposite ends of segment 5b as shown in FIG. 5, the amplifier provides zero difference voltages between the voltages of shoes 56 and 58 and between the voltages of shoes 57 and 58. This is obvious from the fact, as previously mentioned, that segment 5b and conductor 53 are simultaneously provided with a voltage of five volts. This deenergizes motor 36 whereupon elongated members 34 and supporting carriage 40 are stopped in front of vertical column 5 of load support 12 in FIG. 2. The precise position of shoe 58 on conductor 53 is not critical at any time. Thus, the column of load storing spaces corresponding to the tens digit 5 of the numerically preselected storing space 54 is now located in load support 12. Electric bus 60 is grounded at the opposite ends of segments 1b through 10b and conductor 53 in FIG. 4 serves to deenergize motor 36 and stop shoes 56 and 57 actuated thereby in FIG. 4 under emergency conditions. In a similar manner, each of the remaining columns of storing spaces in load support 12 may be identified. This means that voltages corresponding to the respective remaining columns are placed one at a time on conductor 53, and this voltage is compared with those of the associated segments 1b through 10b of conductor 54a in FIG. 4 until the amplifier provides the zero voltage in the manner previously mentioned to stop motor 36.

Figures 9, 14:
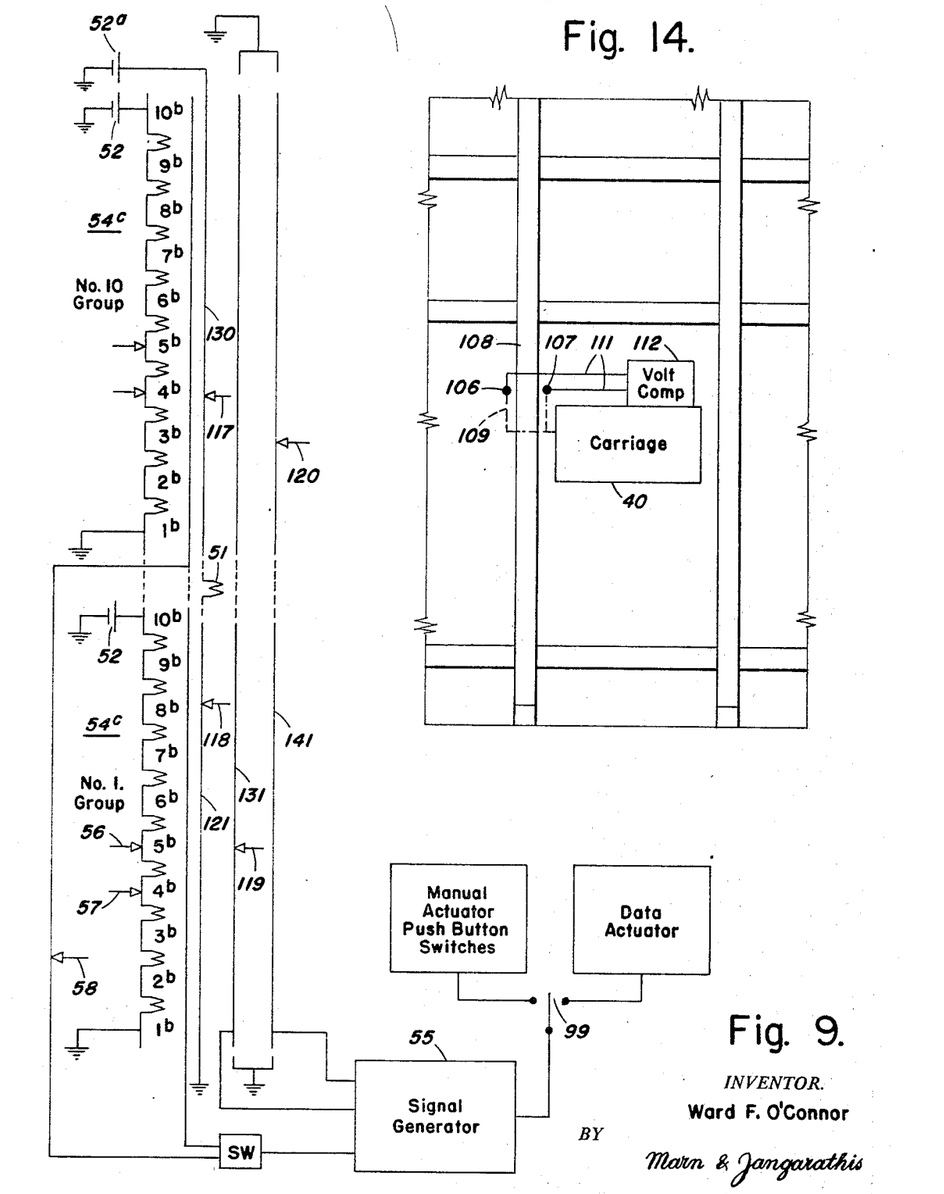
FIG. 14 is a front elevational view looking into a given column of load storing spaces in FIG. 2.

It may occur that a vertical center line of carriage 40 is positioned a small distance off the vertical center line of column 5 in FIG. 14. This malposition of the carriage may tend to interfere with free movement of loading fork 43 on the carriage into and out of the respective storing spaces in column 5 and thereby tend to cause damage to the load, load storing support or carriage, and perhaps to all three. As shown in FIG. 14, such malposition of the carriage may be corrected before proceeding with further action by two ferromagnetic sensors 106 and 107 of a well-known type suitably mounted on the carriage as indicated by dot-dash line 109 and positioned normally to straddle opposite sides of vertical storing space member 108 by equal amounts. The two sensors are connected via electric leads 111 to a voltage comparator 112. When the carriage is properly positioned in front of column 5, the sensors provide equal output voltages to the comparator which produces a zero difference output voltage. As a consequence, no further action is necessary. When, however, the sensors proved unequal output voltages indicating a malposition of the carriage, the comparator produces a difference output voltage of a particular polarity. This difference voltage effective on lead s and pick-up shoe b is supplied to the logic control. This control is programmed to address the data actuator via an obvious circuit including conductor s and shoe b and conductor 55d to the effect the carriage requires further movement either to the right or left in front of column 5. The data actuator then activates the signal generator to energize motor 36 in the manner above mentioned for the corrective purpose. The polarity of the comparator output difference voltage determines the directional rotation of motor 36 to correct the malfunction. Once, the comparator produces the zero difference output voltage, the logic control is programmed to so address the data actuator via an obvious circuit including conductor s and shoe b to resume normal operation.

The horizontal row containing the particular load storing space corresponding to units digit 4 of the numerically preselected storing space 54, i.e., the fourth storing space up from the floor in column 5 in FIG. 2, in load support 12 is now located in accordance with the following procedure. Referring to FIGS. 4, 10, 12 and 13, it is shown therein that additional electrical conductive segments having equal lengths and arranged in a vertical straight line with equal amounts of spacing between the opposing ends of adjacent segments are consecutively numbered from 1a through 10a to represent the horizontal storing space rows, respectively. Each pair of adjacent segments is connected by resistor 51; and the serially connected segments and resistors are connected across the positive and negative terminals of a source 65 of direct voltage. As hereinbefore mentioned, the respective resistors 51 embody equal amounts of fixed resistance magnitudes whereby a drop of one volt is produced across each thereof. The combination of segments 1a through 10a is identified hereinafter as conductor 84 in FIGS. 4, 10 and 11 to simplify the description as it is later apparent.

FIGS. 1, 4, 10, 11, 12 and 13 show a plurality of angle brackets 120 having one end suitably secured to a vertical edge of elongated member 34 for supporting a housing 121 formed of a rigid material substantially in a semicirice and lined on its interior surface with a suitable electric insulating substance 122. Positioned interiorly of the housing in spaced parallel relation in a transverse direction are electric conductor 81 and engaging electric pick-up shoe 81a, electric conductor 82 and engaging electric pick-up shoe 82a, electric conductor 83 and engaging electric pick-up shoe 83a, electric conductor 84 representing the respective conductor segments 1a through 10a, and electric pick-up shoes 70 and 71 and a spare electric conductor sa and engaging spare electric pick-up shoe ba. It is understood that conductor 66 is coextensive with the overall length of segments 1b through 10b constituting conductor 54a in FIGS. 4, 10 and 13. The several conductors and pick-up shoes engaged therewith in FIGS. 4 and 10 are discussed below with reference to their respective functions. Conductors 84, 81, 82, 83 and sa are mounted on a suitable electric insulating material 34a which is attached to an inside broad surface of elongated member 34. It is to be understood that the pick-up shoes engaging the several conductors are so mounted in spaced relation on carriage 40 as illustrated by electrically insulated support 105 in FIG. 13 that the pick-up shoes engage the associated conductors as the carriage is moved in vertical directions on elongated member 34 under control of motor 37 in a manner which is subsequently explained. It is obvious that the number and spacing of angle brackets 120 on elongated member 34 are determined by the height of load support 12 and the weight of the housing 121 and 122 and conductors included thereunder at a given time, and further that the lengths of and spacing between segments 1a through 10a are determined by the vertical dimensions of the respective load storing spaces except as hereinafter mentioned.

Voltage source 65 in FIG. 4 provides segment 10a with an effective voltage of ten volts, segment 9a with nine volts, and so on in a progressively decreasing numerical order of steps of 1 volt until segment 1a is provided with an effective voltage of one volt. Thus, the respective segments 1a through 10a are provided with progressively increasing voltage magnitudes in steps of one volt from one through ten, respectively. This permits the preselection of segments 1a through 10a in FIG. 4 to represent the ten storing spaces in each of the columns, including column 5, looking from aisle 11 into the front face of the columns of storing spaces from the floor upwardly in FIG. 2. Thus, segments 1a through 10a are preselected to represent the respective storing spaces 1 through 10, respectively, included in vertical column 5 of the storing spaces looking into the front face thereof from the floor upwardly in FIG. 2. At the same time, signaling generator 55 in FIG. 4 is connected via lead 55b to continuous electric conductor 66 which is located in proximity of conductor 53 in FIG. 10 and transmits through shoe 72 the voltage on conductor 66 to conductor 81 and shoe 81a for comparison with the voltage on segmented conductor 84 for a purpose mentioned below.

It is recalled from the previous explanation that signaling generator 55 in FIG. 4 variable in 1-volt steps from one through ten volts is operated by actuator 100 to apply a voltage of four volts via lead 55b to conductors 66 and 81 associated with segment 4a in conductor 84 for representing the fourth storing space from the floor in each of vertical columns 1 through 10 in FIG. 2. It is also recalled from the previous explanation that voltage source 65 provides an effective voltage of four volts on segment 4a in FIG. 4 for representing the fourth storing space from the floor in each of vertical columns 1 through 10 in FIG. 2. It is further recalled from the previous explanation that carriage 40 is now positioned in front of vertical column 5 of load support 12 in FIG. 2. Now the procedure is to initiate such action as to elevate carriage 40 to a position opposite the front face of load storing space 4 in storing space column 5 in FIG. 2. Ground bus 60 at the opposite ends of segments 1a through 10a and conductors 66 and 81 in FIG. 4 serve to deenergize motor 37 and stop the shoes actuated thereby in FIG. 6 under emergency conditions.

In further response to signals of actuator 100 to retrieve pallet 22 and load 23 thereon from preselected space 54 in FIG. 2 as hereinbefore mentioned, the programmed logic control 101 in FIGS. 1, 3, 4, 10 and 11 deenergizes motor 36 to stop carriage 40 in front of column 5 in FIG. 2 as previously described and at the same time energizes motor 37. This drives sprocket 38 and thereby chain 39 to raise or lower carriage 40 in front of column 5 depending upon the location of the carriage at the moment of the motor energization. At the same time electric pick-up shoes 70, 71 and 81a shown schematically in FIGS. 4, 6 and 13 and mounted in spaced relation on the carriage are moved therewith for a purpose hereinafter pointed out. As shoes 70 and 71 are actuated in slidable engagement with one or more of segments 1a through 10a constituting conductor 84 in sequence depending on the position of carriage 40 at the instant of the energization of motor 37 and contact shoe 81a is also actuated in slidable engagement with conductor 81, the voltages picked up by the respective shoes 70 and 71 are individually compared with the voltage picked up by shoe 81a in amplifier 59.

This amplifier translates the compared voltages into difference voltages having varying magnitudes in such manner that the difference voltage between the voltages of shoes 70 and 81a and between the voltages of shoes 71 and 81a serve respectively to energize motor 37. So long as the magnitude of one voltage difference or the magnitudes of both voltage differences is greater than zero, motor 37 is continuously energized to activate sprocket 38 and chain 39 to move carriage 40 and thereby slide shoes 70 and 71 in engagement with the respective segments 1a through 10a and shoe 81a in engagement with conductor 81. While motor 37 is energized to actuate the chain, carriage 40 is raised or lowered in front of column 5 depending upon the particular elevated position of the carriage at the initial energization of the motor, as above mentioned. When, however, shoes 70 and 71 are positioned adjacent to opposite ends of segment 4a, as shown, for example, in FIG. 6, the amplifier provides zero difference voltages between the voltages of shoes 70 and 81a and between the voltages of shoes 71 and 81a. This zero voltage difference serves to deenergize motor 37 whereupon carriage 40 is stopped in front of storing space 4 in column 5 of load support 12. The precise location of shoe 81a on conductor 81 is not critical at any time. Thus, the units digit 4 of the numerically preselected storing space 54 is now located in load support 12.

The logic control in FIG. 4 is programmed to inform the data actuator in an obvious circuit including conductor sa and shoe ba that the carriage is properly positioned in front of load storing space 54 in load support 12 and to proceed now with normal actuation of the signal generator for the purpose of retrieving the load from the latter storing space.

As carriage 40 is properly positioned in front of storing space 54 in load support 12 in FIG. 2 as previously mentioned, there remains the provision of instructing the carriage in FIGS. 1, 2, 3, 4, and 11 to retrieve the pallet and load thereon from the latter storing space in accordance with the foregoing initial assumption. For this purpose, it is understood that load handling fork 43 mounted on the telescoping rack secured to the carriage is also properly positioned in front of storing space 54 in load support 12 awaiting to retrieve the pallet and load therefrom under control of motor 41. Accordingly, in additional response to the control signals initiated by actuator 100 in FIG. 10 to achieve this objective, the programmed logic control 101 suitably mounted via support 101b on elongated member 34 in FIG. 3 and responding to the deenergization of motors 36 and 37 permits the energization of motor 41, mounted on carriage 40. The pallet and load retrieval from space 54 are achieved in accordance with the procedure described below in connection with FIGS. 3, 4, 10 and 11, in addition to the several figures previously mentioned.

It is understood that appropriate signals initiated in actuator 100 activate signal generator 55 in FIG. 4 to transmit suitable signals to motor 41 via lead 55c, conductor 79 and engaging shoe 80, logic control 101, conductor 82 and engaging shoe 82a. This energizes motor 41 to actuate pinion gear 42 which operates rack 42a in a horizontal direction to move fork 43 from a normal position on the rack into load storing space 54 in FIGS. 1 and 2. Next, motor 37 is energized in the manner above mentioned to elevate the carriage and thereby the fork in a vertical direction for lifting the pallet and load thereon clear of transverse members 21, 21, and is thereafter deenergized. Then, motor 41 is again energized to actuate the pinion gear which operates the rack in an opposite horizontal direction to withdraw the fork together with the pallet and load thereon from load storing space 54 to a normal position on the rack. Finally, motors 36 and 37 are energized and deenergized in an appropriate sequence to move the carriage and the loaded fork thereon in proper horizontal and vertical directions, respectively, in the aisle to the loading and unloading station, not shown, as previously mentioned. The logic control is also programmed to control further motor 41 and thereby the extension and retraction of the loading fork to dispose the load at the loading and unloading station, essentially in the manner above explained. As a consequence, the logic control is programmed to inform the data actuator that the assigned action to remove the pallet and load from storing space 54 in load support 12 is completed and is awaiting a new assignment.

The foregoing action of retrieving a pallet and load from a preselected storing space may be summarized as follows with reference to FIGS. 4 and 10: (1) data actuator stimulates signal generator to transmit appropriate signals via lead 55a, conductor 53 and segmented conductor 54a and shoes 58 and 56 and 57, respectively, and the logic control; (2) motor 36 energized by the output signals of the logic control and amplifier actuates elongated members 34 and 35 and carriage 40 to a position at column 5 of storing spaces in FIG. 2; (3) motor 36 is deenergized by logic control to stop the elongated members together with carriage in front of column 5 of storing spaces; (4) motor 37 is energized via logic control, segmented conductor 84 and continuous conductor 81, shoes 81A and 70 and 71, respectively, to position the carriage in front of storing space 54 and is then deenergized; (5) logic control checks malposition of the carriage and then addresses the data actuator to correct the same via conductor s and shoe b and simultaneously therewith checks the stopped motors 36, 37 and 41; (6) logic control checks condition of the pallet and load in storing space 54 by means of a disparity between the signals thereof and those of the signal generator via conductor sa and shoe ba, conductor s and shoe b; (7) logic control energizes motor 41 to extend loading fork 43 in FIGS. 1, 3 and 10 into storing space 54 and motor 41 is deenergized; (8) logic control energizes motor 37 to raise the carriage to engage the pallet and is then deenergized; (9) logic control energizes motor 41 to retract the fork and pallet thereon and is then deenergized; (10) logic control informs data actuator that storing space 54 is now vacant; (11) logic control energizes motor 36 to move the elongated members and carriage to the loading and unloading station and then deenergizes the motor; (12) logic control energizes motor 41 to extend the fork at the loading and unloading station to dispose of the pallet thereon; and (13) logic control informs the data actuator that the system has completed its assignment and is awaiting new instructions. In performing the several operation steps just enumerated, it is obvious that the continuous and segmented conductors together with the respective shoes shown in FIG. 4 are utilized at different times.

When a load is to be taken from the loading and unloading station for placement into preselected storing space 54, for example, just emptied or another preselected storing space in load support 12, the necessary operation of the automatic apparatus is achieved in the following manner which is equivalent in several essential respects to the load retrieving operation just described for load support 12. For the load placement operation, it is now assumed that a pallet bearing a load has been placed on fork 43 by a manual or other operation at the loading and unloading station. Data actuator 100 in FIGS. 4 and 10 including the information required for the load placement operation activates the signal generator and logic control in sequence to provide the following steps: (1) energize motor 36 to actuate roller 31 for moving carriage 40 bearing loaded fork 43 in a horizontal direction along aisle 11 to a position in front of the column of storing spaces including storing space 54 and then deenergize the motor; (2) energize motor 37 to move carriage 40 in a vertical direction to a position opposite storing space 54 and above members 21, 21, and deenergizing the motor; (3) logic control checks malposition of the carriage and addresses the data actuator to correct same; (4) logic control addresses the data actuator to check location and deenergized motors; (5) logic control requests data actuator to check occupancy of the space 54 and, if occupied, send an appropriate signal; (6) logic control is activated via conductor 82 and shoe 82a to energize motor 41 and thereby actuate pinion gear 42 and rack 42a to extend the fork together with the pallet and load thereon in a horizontal direction into storing space 54; (7) upon receipt of a signal from the logic control deenergize motor 41 while energizing motor 37 to lower the carriage including the fork having the pallet and load thereon in a descending vertical direction until the pallet is resting on members 21, 21, and further energize motor 37 until the empty fork is further moved in the descending vertical direction to clear the bottom surface of the pallet, then deenergize the motor; (8) energize motor 41 to retract the telescoping rack and empty fork in a horizontal direction from storing space 54 to its normal position on carriage 40; and (9) logic control informs the data actuator that the storing space 54 is now occupied, the assignment is completed, and new instructions are awaited. In the performance of the load placement operation just described, it is obvious that the elements and continuous and segmented conductors together with the respective shoes shown in FIGS. 4 and 10 in a manner similar to or identical with that of the action for retrieving a load from storing space 54 in a load support as previously explained.

While the above description mentions the carriage is moved at right angles due to the separate energization of motors 36 and 37, it is obvious that both latter motors may be simultaneously energized thereby moving the carriage at an oblique angle between the latter's starting and stopping points.

FIG. 7 delineates a shoe voltage pick-up modification which may be substituted for shoes 56, 57 and 58 in FIG. 5 or shoes 70, 71 and 81a in FIG. 6. It is noted in FIG. 7 that shoes 73 and 74 mounted in spaced relation on a unit 75, which is mounted on carriage 40, engage the respective segments 1b through 10b in sequence in FIG. 4 under control of motor 36 for locating vertical column 5 or similar shoes and units, not shown, to engage the respective segments 1a through 10a in sequence in FIG. 4 under control of motor 37 for locating storing space 4 in load support 12. Operational amplifier 59 compares the magnitudes of the two voltages picked up by shoes 73 and 74 as the latter are caused to slidably engage the respective segments of segments 1b through 10b via motor 36 or the equivalent shoes and units, not shown, on segments 1a through 10a via motor 37. So long as the magnitude of the difference voltage between the voltages of shoes 73 and 74 exceeds a predetermined value, the motor 36 or motor 37 is sequentially energized and deenergized to achieve their respective objectives in the manner hereinbefore explained.

When, however, shoes 73 and 74 are positioned near the ends of adjacent segments such as, for example, adjacent segments 5b and 6b in FIG. 7 to represent identical adjacent segments 5b and 6b in FIG. 4, or to represent adjacent segments 4a and 5a in FIG. 4 but not shown in FIG. 7 for the present purpose for locating storing space 54 in FIG. 2 as above explained, the difference voltage between the voltages of shoes 73 and 74 has a predetermined magnitude. This predetermined difference voltage serves to deenergize motors 36 and 37 in sequence for the aforesaid purpose of locating carriage 40 in front of vertical column 5 and horizontal space 4 and thereby in front of storing space 54 in FIG. 2 as above explained.

It is noted that such predetermined voltage difference is due to the fact that adjacent segments in segments 1b through 10b or in segments 1a through 10a have different voltage values as hereinbefore mentioned. Obviously, the modification of FIG. 7 does not require the use of continuous conductors 53 and 81 and engaging shoes 58 and 81a shown in FIG. 4. Therefore, an advantage of the modification in FIG. 7 resides in the reduction of the number of electric conductive components and only the use of equal lengths of segmented conductors to locate carriage 40 before a particular storing space in a particular column thereof or different size storage spaces. These reductions can serve to improve the reliability of the operation of the overall automatic apparatus in FIGS. 1 and 2.

Figure 8A:
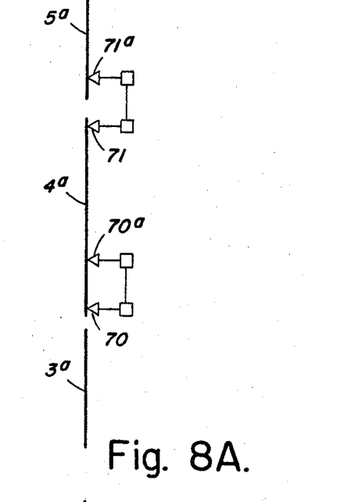
Figure 8B:
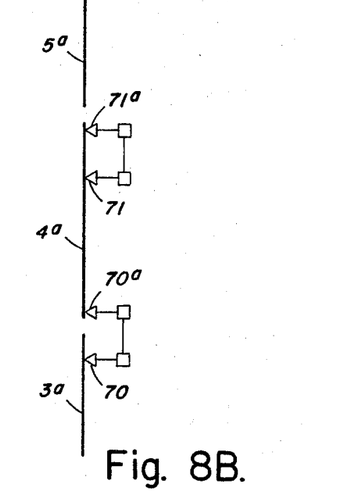

FIGS. 8a and 8b represent a modification of FIG. 4 and indicate an alternate arrangement for effecting the operation of motor 37 to position fork 43 relative to members 21, 21, for picking up the pallet and load therefrom or placing the pallet and load thereon. For this purpose, electric voltage pickup shoes 70 and 70a form one pair of electric voltage pick-up shoes 71 and 71a constitute the second pair, both of which shoe pairs engage conductor segments 1a through 10a. The distance between shoes 70 and 70a and the distance between shoes 71 and 71a are equal to the amount of vertical travel of carriage 40 to pick up or discharge a load in load space 54. Actuator 100, signal generator 55 and logic control 101 determine and initiate the sequence switching between the shoe pairs to fix the rotational direction of the rotor of motor 37 at a given moment. FIG. 8a shows the relative engaging positions of shoes 70, 70a, 71 and 71a with segment 4a when the fork on the carriage is loaded; and FIG. 8b shows the relative engaging positions of shoes 70, 70a, 71 and 71a with segment 4a when the fork on the carriage is unloaded.

When a pallet and a load thereon are to be retrieved from or placed in a preselected storing space in load support 13 in FIG. 1, it is understood that the automatic apparatus functions for such retrieval or placement in a manner essentially identical with that hereinbefore described for the corresponding load retrieval or placement in load support 12. Appropriate data from actuator 100 in FIG. 10 stimulates signal generator 55 and logic control 101 to achieve the selection of load support 13 for the purpose of the load retrieval or placement action. It is understood, however, that the application of discrete voltages of appropriate polarities to conductor 82 via signal generator 55 in FIG. 4 would serve equally as well to select load support 13 over load support 12, and vice versa. It is understood that the operation of the equipments and circuits as above described for load retrieval or placement in load support 12 is the same for load retrieval or placement in load support 13, once load support 13 has been selected. In this connection, fork 43 on carriage 40 in FIGS. 1, 3, 10 and 13 is constituted by an equivalent element on the opposite side of the carriage.

FIG. 9 illustrates an arrangement of load supports 12 or 13 associated in groups of ten (decades) where large numbers of load storing spaces are to be serviced. This arrangement uses, in addition to the required number of segmented conductors 54a and continuous conductors 53 in FIGS. 1, 4 and 10, an additional number of conductors comprising a first group of segmented conductors 121 through 130, each representing one of ten groups of ten supports 12 and having a length coextensive therewith; a second group of segmented conductors 131 through 140, each representing ten groups of load supports 12 and having a length coextensive therewith; and a continuous conductor 141 representing ten times ten groups of load supports 12 (i.e.,) 100 groups of load supports 12 and having a length coextensive therewith. Voltage pick-up shoes 117, 118, 119 and 120 are slidably engaged with the respective conductors. It is apparent that FIG. 9 illustrates ten groups of load supports 12; it is understood that each additional group of ten load supports 12 beyond such one is to include segmented and continuous conductors in appropriate numbers and lengths.

In FIG. 9, group No. 1 is selected by simultaneously placing voltages of 1 through 10 volts via source 52a of direct voltage on conductors 121 and 131, respectively, and a voltage of 1 volt on conductor 131 via signal generator 55 and comparing the voltages on the respective segments 121 and 130 and on conductor 131 via pick-up shoes 117, 118 and 119 and amplifier 59 as motor 36 moves the elongated members 34 and 35 past the Nos. 1 through 10 supports 12 in response to a difference between the latter voltages in the manner previously mentioned. When such voltage difference is zero, motor 36 is deenergized to stop the elongated members in the area of group No. 1 as corresponding with the voltage of 1 volt placed on conductor 131. Thereafter, pallet 22 and load 23 thereon may be removed from storing space 54, for example, in such No. 1 group of supports 12 by (1) comparing the 1 through 10 volts placed on segments 1b through 10b, respectively, and the five volts placed on conductor 53 in FIGS. 4, 5 and 9 for providing the zero voltage difference to deenergize motor 36 to stop elongated members 34 and 35 in front of column 5 in the No. 1 group, and (2) comparing the 1 through 10 volts placed on segments 1a through 10a, respectively, and the 4 volts placed on conductor 81 in FIGS. 4 and 6 to deenergize motor 37 to stop carriage 40 in front of row 4 of column 5 in the No. 1 group in the manner previously explained.

It is obvious in FIG. 9 that each of the remaining Nos. 2 through 10 groups of load supports 12 in the first ten groups may be selected by applying voltages in the range from 2 through 10 volts via voltage source 52a and one particular voltage in the latter range to conductor 131 via generator 55 and comparing such voltages until the zero difference therebetween is obtained. This deenergizes motor 36 to stop the elongated members 34 and 35 at the particular group in the Nos. 2 through 10 groups corresponding with the particular value of voltage placed on conductor 131. Similarly, each ten groups of the assumed 100 groups of load supports 12 in FIG. 9 may be selected by applying the 1 through 10 volts to conductors 131 through 140, respectively, but not shown, and a particular voltage or conductor 141. These voltages are compared via shoes 119 and 120 and amplifier 59 until the zero voltage difference deenergizes motor 36 at the particular one of the ten groups of load supports 12 corresponding with the particular voltage value placed on conductor 141. Thereafter, a particular group of load supports 12 in the last-mentioned one group of ten load supports may be selected in the manner just explained. It is obvious that each of the remaining groups load supports 12 may be selected by applying appropriate voltages to one of the remaining conductors 121 through 130, as well as to conductor 131.

It is obvious from the above description using voltage increments that groups of locations may be addressed by using frequency techniques as, for example, by frequency shift similar to the well-known tone technique. One advantage in frequency shift is that conductors 121 through 141 in FIG. 9 may be omitted. Each group of ten load supports 12 may be identified by signals of one or more different frequencies imposed on each of the ten segments in FIGS. 4 and 9. Frequency communication may be had by electronic pick-ups, equivalent to the voltage pick-up shoes, familiar to the art and mounted on elongated members 34 and 35 as they are moved along the aisles of load storing spaces.

It is obvious that switch 99 in FIG. 10 may be moved to manual actuator 100a to provide a manual operation of the above-described equipment via an array of mechanical push-buttons known to the art. According to the semiautomatic operation, the desired load storing space for load retrieval or placement is set up in the push-buttons, and the subsequent operation of the system is controlled thereby.

It is apparent that the voltages picked up via shoes 56, 57 and 58 from conductors 54a and 53, as well as those picked up via shoes 70, 71 and 81a from conductors 84 and 81 in FIGS. 4, 5 and 6 may be utilized in the well-known manner for accelerating or decelerating the movements of elongated members 34 and 35, as well as carriage 40, depending upon the location of the elongated members or carriage relative to a given load storing space upon the receipt of particular instructional voltage signals. For these purposes, large magnitudes of differential voltages would serve to speed up motors 36 and 37 whereas small magnitudes of the differential voltage would serve to slow down the latter motors.

It is understood that the invention herein is described in specific respects for the purpose of this description. It is also understood that such respects are merely illustrative of the application of the invention, particularly in the respect that the direct voltages may be replaced by alternating voltages or the use of discrete voltages by the use of discrete alternating current frequencies or any combination of voltages or frequencies.

It is also understood that pick-up shoes in direct contact with conductors may be replaced with other techniques such as, for example, magnetics requiring the sensing head used in place of the engaging shoes and located in proximity of the conductors but not in engagement therewith. Numerous other arrangements may be devised by those skilled in the art without departing from the spirit and scope of the invention.

What is claimed is:

1. An automatic load transporting apparatus continuously transmitting a plurality of instructional signals between two spaced geographical points comprising:

a support having a plurality of columns and horizontal rows of load storing spaces, each common to one column and one row;

guide means fixedly positioned along said support and extending coextensively in parallel relation therewith;

means movable in a horizontal direction on said guide means for transporting loads to and from said storing spaces;

motor means on said movable means for actuating said movable means on said guide means;

and means to control the energization and deenergization of said motor means and thereby the actuation and stopping, respectively, of said movable means on said guide means, including:

first electric conductor means fixedly mounted on said support and comprising a plurality of conductor segments, each substantially coextensively with one of said storing space columns for providing a first plurality of discrete voltages of different magnitudes at the same time to constitute one part of a first of said signals, each of said last-mentioned signals on one of said segments representing one of said columns of storing spaces;

second electric conductor means fixedly positioned on said support and extending substantially coextensively therewith for providing a second plurality of discrete voltages of different magnitudes to constitute another part of said first signal, each of said last-mentioned voltages provided one at a time and having different magnitudes equal to the different magnitudes of said first-mentioned discrete voltages, each of said second-mentioned voltages of different magnitudes also representing one of said columns of storing spaces;

and first means on said movable means for successively comparing said first-mentioned voltages on said segments and a preselected one of said second-mentioned voltages on said second conductor means at a given time as said movable means is actuated on said guide means in such manner that two of said first-mentioned voltages and said last-mentioned preselected one voltage provide at a first given time two discrete difference voltages of which at least one has a magnitude greater than zero for continuing the energization of said motor means and the actuation of said movable means on said guide means and further in such manner that one of said first-mentioned voltages on one of said segments and said preselected one voltage on said second conductor means provide at a second given time a difference voltage having a zero magnitude for deenergizing said motor means and stopping the actuation of said movable means on said guide means at a particular column of storing spaces as represented by said last-mentioned preselected one of said second-mentioned voltages on said second conductor means.

2. The apparatus according to claim 1 in which said voltage comparing means compares said two first-mentioned voltages on adjacent pairs of said segments and preselected one voltage of said second-mentioned voltages as said movable means is actuated on said guide means in such manner that said two first-mentioned voltages on said adjacent pairs of segments and preselected one voltage on said second conductor means provide said first-mentioned two difference voltages, each having a magnitude greater than zero, to continue the energization of said motor means and the actuation of said movable means on said guide means.

3. The apparatus according to claim 1 in which said first voltage means includes:

a plurality of resistors, each having the same predetermined amount of resistance and connecting two adjacent segments to connect said segments and resistors in series;

and a source of voltage connected across said serially connected segments and resistors to provide said first plurality of discrete voltages of different magnitudes on said segments at the same time for representing said respective columns of storing spaces, each different magnitude of voltage effective on one of said segments representing one of said columns of storing spaces.

4. The apparatus according to claim 3 in which said second conductor means includes:

a continuous electric conductor affixed to said support adjacent to and coextensive with said serially connected segments and resistors;

and a second source of voltage connected to said continuous conductor and adjustable to provide said second plurality of discrete voltages of different magnitudes thereon, one at a time.

5. The apparatus according to claim 4 in which said first voltage comparing means includes a plurality of electric voltage pick-up shoes of which:

first and second shoes are slidably engageable with adjacent pairs of said segments and a third shoe is slidably engageable with said continuous conductor at the same time as said movable means is actuated on said guide means in such manner that said first and second shoes derive said two of said first-mentioned voltages from said adjacent pairs of segments and said third shoe derives said preselected one voltage from said continuous conductor to provide at said first given time said first-mentioned two difference voltages of which at least one has a magnitude greater than zero for continuing the energization of said motor means and the actuation of said movable means on said guide means and further in such manner that said first and second shoes derive a voltage from one of said segments and said third shoe derives said last-mentioned preselected one voltage from said continuous conductor to provide at said second given time difference voltages having zero magnitudes to deenergize said motor means and to stop the actuation of said movable means on said guide means at said column of spaces as represented by said last-mentioned one segment having a voltage of a magnitude equal to the magnitude of said preselected one voltage on said continuous conductor.

6. The apparatus according to claim 1 in which said movable means comprises:
roller means actuable on said guide means by said motor means;
elongated means depending from said roller means in proximity of successive columns of said storing spaces as said movable means is moved along guide means by said motor means;
a carriage mounted on said elongated means and movable adjacent to each of said columns of storing spaces in a direction normal to said movable means direction;
second motor means mounted on said elongated means for actuating said carriage in said normal direction;
and said control means further controlling the energization and deenergization of said second motor means and the actuation and stopping, respectively, of said carriage on said elongated means, and further including;
third electric conductor means fixedly mounted on said elongated means and comprising a plurality of conductor segments, each substantially coextensive in a vertical direction with one storing space in each of said columns of storing spaces for providing a third plurality of discrete voltages of different magnitudes at the same time to constitute one part of a second of said signals, each of said second signals on one of said segments representing one horizontal row of said storing spaces in said support;
fourth electric conductor means fixedly mounted on said support and extending substantially coextensively therewith for providing a fourth plurality of discrete voltages of different magnitudes to constitute another part of said second signal, each of said last-mentioned voltages provided one at a time and having different magnitudes equal to the different magnitudes of said third means discrete voltages; each of said last-mentioned voltages also representing one horizontal row of said storing spaces in said support;
and second means on said movable means for successively comparing said discrete voltages as said second-mentioned segments and a preselected one of said fourth discrete voltages as said fourth conductor means as said carriage is actuated on said elongated means in such manner that two of said third discrete voltages on said second-mentioned segments and a preselected one of said fourth discrete voltages provide at a third given time two discrete difference voltages of which at least one has a magnitude greater than zero for continuing the energization of said second motor means and the actuation of said carriage on said elongated means and further in such manner that one of said third discrete voltages on one of said second-mentioned segments and said preselected one of said fourth voltages provide at a fourth given time a difference voltage of zero magnitude for deenergizing said second motor means and to stop the actuation of said carriage on said elongated means at a particular horizontal row of storing space in said support as represented by said last-mentioned preselected one of said fourth-mentioned voltages on said fourth conductor means.

7. The apparatus according to claim 6 in which said third conductor means includes;
a second plurality of resistors, each having the same predetermined amount of resistance and connecting two adjacent segments of said second-mentioned segments to connect said last-mentioned segments and resistors in series;
and a third source of voltage connected across said last-mentioned serially connected segments and resistors to provide said third plurality of discrete voltages of different magnitudes on said last-mentioned segments for representing said respective horizontal rows of storing spaces, each different magnitude of voltage effective on one of said last-mentioned segments representing one of said horizontal rows storing spaces.

8. The apparatus according to claim 7 in which said second voltage comparing means compares two of said third discrete voltages and said preselected one of said fourth discrete voltages as said carriage is actuated on said elongated means in said normal direction in such manner that said last-mentioned two third discrete voltages on adjacent pairs of said last-mentioned segments and preselected voltage on said fourth conductor means provide said third-mentioned two difference voltages, each having a magnitude greater than zero, to continue the energization of said second motor means and the actuation of said carriage on said elongated means.

9. The apparatus according to claim 7 in which said fourth conductor means includes;
a second continuous electric conductor;
and a fourth source of voltage connected to said second continuous conductor to provide said fourth plurality of discrete voltages having different magnitudes thereon, one at a time.

10. The apparatus according to claim 9 in which said second voltage comparing means includes a second plurality of voltage pick-up shoes of which:
fourth and fifth shoes are slidably engageable with adjacent pairs of said segments of said second-mentioned segments and a sixth shoe is slidably engageable with said second continuous conductor at the same time as said carriage is actuated on said elongated means in such manner that said fourth and fifth shoes derive voltages from said adjacent pairs of said second-mentioned segments and said sixth shoe derives said preselected one voltage from said second continuous conductor to provide at said third given time to provide two difference voltages of which at least one has a magnitude greater than zero for continuing the energization of said second motor means and the actuation of said carriage on said elongated means and further in such manner that said fourth and fifth shoes derive a voltage from one of said segments and said sixth shoe derives said last-mentioned preselected one voltage from said second continuous conductor to provide at said fourth given time difference voltages having zero magnitudes to deenergize said second motor means and to stop the actuation of said carriage on said elongated means at a particular horizontal row of said storing space as represented by said last-mentioned one segment having a voltage of a magnitude equal to the magnitude of said preselected one voltage of said second continuous conductor.

11. The apparatus according to claim 6 which includes:
load handling means extensible from said carriage into the respective storing spaces in said support and retractable therefrom to said carriage in directions transverse to the normal direction of movement of said elongated means;
third motor means mounted on said carriage for actuating said load handling means;
and said control means transmits additional signals for further controlling the energization and deenergization of said first, second and third motor means, said last-mentioned control means includes means responsive to certain of said additional signals to energize said third motor means to extend said load handling means into said particular storing space and to deenergize said third motor means, means responsive to others of said additional signals to energize said second motor means to move said carriage a preselected amount in a predetermined direction and to deenergize said third motor means, means responsive to further additional signals to energize said third motor means to retract said load handling means from said particular storing to a normal position on said carriage and to deenergize said third motor means, and means responsive to still further additional signals to energize said first motor means to move said movable means to a predetermined location.

12. The apparatus according to claim 6 which includes means responsive to the magnitudes of the difference voltages for controlling the speeds of said first and second motor means in such manner that large magnitudes of difference voltages actuate said last-mentioned motor means to full speed and to small magnitudes of difference voltages decelerate said last-mentioned motor means.

13. The apparatus according to claim 1 which includes means for further energizing said motor means to the position of said movable means in the horizontal direction with reference to a vertical center line of said particular column of storing spaces.

14. The apparatus according to claim 1 which includes data means for actuating said control means.

15. The apparatus according to claim 1 which includes manual means for actuating said control means.

16. The apparatus according to claim 1 which includes at least two load storing supports arranged in spaced parallel relation in a horizontal direction, and signaling means for preselecting one of said last-mentioned supports for loading and unloading operations at a given time.

17. The apparatus according to claim 11 in which said control means includes means transmitting new instructional signals on said conductor of said first and second means for informing said movable means of new assignments.

18. The apparatus according to claim 1 in which each of said first and second voltage comparing means includes a negative feedback amplifier having a high input impedance, a high open loop gain and a low output impedance for drawing low magnitudes of input current in a voltage range of the order of one through ten volts of direct voltage from said first, second, third and fourth conductor means.

19. An automatic load transporting apparatus continuously transmitting a plurality of instructional signals comprising in combination:
 a support having a plurality of columns and horizontal rows of load storing spaces, each common to one column and one row;
 a track positioned along and in parallel with said support;
 means movable in a horizontal direction on said track for transporting loads to and from said storing spaces;
 first motor means on said movable means for actuating said movable means on said track;
 control means for energizing said first motor means to actuate said movable means on said track;
 first segmented conductor means on said support for providing a first plurality of discrete voltages of different magnitudes at the same time, each conductor segment having a different voltage in a certain voltage range for representing one of said storing space columns, each conductor segment positioned at one of said storing space columns;
 first continuous conductor means on said support for providing a second plurality of discrete voltages of different magnitudes, one at a time, said last-mentioned voltage magnitudes being equal to the different magnitudes of said first plurality of voltages, each of said second plurality of voltages representing one of said columns of storing spaces;
 first means on said movable means for successively comparing the respective voltages of said first conductor segments and first continuous conductor as said first motor means actuates said movable means on said track in such manner that two voltages of said first-mentioned voltages on an adjacent two of said segments and a preselected one voltage of said first continuous conductor provide two difference voltages of which at least one has a magnitude greater than zero to continue the energization of said first motor means and the actuation of said movable means and further in such manner that one of said first-mentioned voltages on one of said segments and said last-mentioned preselected one voltage provide a difference voltage having a magnitude equal to zero to deenergize said first motor means to stop said movable means at a particular column of storing spaces as represented by voltages of equal magnitudes on said last-mentioned one segment and continuous conductor;
 elongated means depending from said movable means in a direction normal thereto in proximity of said support;
 a carriage mounted on said elongated means adjacent to said support and movable in a direction normal to said movable means direction;
 said control means energizing said second motor means to actuate said carriage;
 second segmented conductor means mounted on said elongated means, each of said latter segments extending substantially coextensively in a vertical direction with one storing space in each column of said storing spaces for providing a third plurality of discrete voltages of different magnitudes at the same time, each of said voltages on one of said last-mentioned segments representing one storing space in each of said columns thereof;
 second continuous conductor means on said support and extending substantially coextensive therewith for providing a fourth plurality of discrete voltages of different magnitudes, one at a time, said last-mentioned voltages provided one at a time and having magnitudes equal to the magnitudes of said third voltages, each of said last-mentioned voltages also representing one storing space in each of said columns thereof;
 second means on said movable means for successively comparing the respective voltages of said second conductor segments and second continuous conductor as said second motor means actuates said carriage on said elongated means in such manner that two of said third voltages on an adjacent two of said second segments and a preselected one of said second continuous conductor provide two difference voltages at which at least one has a magnitude greater than zero to continue the energization of said second motor means and the actuation of said carriage on said elongated means and further in such manner that one of said third voltages on one of said second segments and said last-mentioned preselected one voltage on said second continuous conductor provide a difference voltage of zero magnitude to deenergize said second motor means to stop the actuation of said carriage at a particular storing space in each column of storing spaces as represented by said last-mentioned one voltage on said last-mentioned one segment and preselected one voltage on said last-mentioned second continuous conductor;
 load handling means extensible from said carriage into the respective storing spaces in said support and retractable therefrom to said carriage in directions transverse to the normal directions of movement of said elongated means;

third motor means on said carriage for extending and retracting said load handling means on said carriage;

said control means transmits additional signals for further controlling the energization and deenergization of said first, second and third motor means, said last-mentioned control means includes means responsive to certain of said additional signals to energize said third motor means to extend said load handling means into said particular storing space of said particular storing space column and to deenergize said third motor means, means responsive to others of said additional signals to energize said second motor means to move said carriage a preselected amount in a predetermined direction and to deenergize said second motor means, and means responsive to further ones of said additional signals to energize said third motor means to retract said load handling means from said particular storing space to a normal position on said carriage and to deenergize said third motor means, and means responsive to still further ones of said additional signals to energize said first motor means to move said movable means to a predetermined location.

20. An automatic load transporting apparatus continuously transmitting a plurality of instructional signals between two spaced geographical points comprising in combination:

a support having a plurality of columns and rows of storing spaces;

a guide means positioned along said storing spaces;

means movable in a horizontal direction on said guide means for transporting loads to and from said storing spaces;

motor means on said movable means for actuating said movable means on said guide means;

control means for controlling the energization and deenergization of said motor means and thereby the actuation and stopping, respectively, of said movable means on said guide means, including;

a plurality of conductive segments so arranged on said support that each segment is positioned at one of said columns of storing spaces;

a plurality of resistors, each having a fixed predetermined amount of resistance and connecting two adjacent segments so as to connect said segments and resistors in series;

a source of voltage connected across said serially connected segments and resistors to provide discrete voltages of different magnitudes on said segments at the same time for representing said columns of storing spaces, each conductor segment and different voltage magnitude thereon representing one of said columns of storing spaces;

and means comprising first and second voltage pick-up shoes successively slidably engageable with an adjacent two of said segments at a given time as said movable means is actuated on said guide means for comparing the voltages on such two successive adjacent segments in such manner that the two voltages picked up by said first and second shoes at a given time provide a difference voltage having a magnitude exceeding a predetermined magnitude to continue the energization of said motor means and the actuation of said movable means and further in such manner that the two voltages picked up by said first and second shoes at another given time provide a difference voltage which is substantially equal to said predetermined magnitude difference to deenergize said motor means and to stop the actuation of said movable means at a column of storing spaces represented by the predetermined voltage difference.

References Cited

UNITED STATES PATENTS

| | | | |
|---|---|---|---|
| 2,699,226 | 1/1955 | Bruns | 187—29 |
| 2,942,736 | 6/1960 | Landsiedel et al. | 212—21 |
| 2,988,237 | 6/1961 | Devol | 214—16.4 |
| 3,119,501 | 1/1964 | Lemelson | 214—16.4 |

HUGO O. SCHULZ, *Primary Examiner.*

RAYMOND B. JOHNSON, *Assistant Examiner.*